United States Patent [19]

Cooper et al.

[11] Patent Number: 4,550,976
[45] Date of Patent: Nov. 5, 1985

[54] FIBER OPTIC CABLE WITH FOAMED PLASTIC DUMMY MEMBERS

[75] Inventors: Stephen M. Cooper, Hickory; Saeed K. Sooudi, Charlotte, both of N.C.

[73] Assignee: Siecor Corporation, Hickory, N.C.

[21] Appl. No.: 648,668

[22] Filed: Sep. 10, 1984

[51] Int. Cl.⁴ ............................................. G02B 5/16
[52] U.S. Cl. .................................................. 350/96.23
[58] Field of Search ...................................... 350/96.23

[56] References Cited

U.S. PATENT DOCUMENTS

| 4,312,566 | 1/1982 | Jackson | 350/96.23 |
| 4,324,453 | 4/1982 | Patel | 350/96.23 |
| 4,333,706 | 6/1982 | Davis et al. | 350/96.23 |

FOREIGN PATENT DOCUMENTS

| 2910135 | 9/1979 | Fed. Rep. of Germany | 350/96.23 |
| 2085188 | 4/1982 | United Kingdom | 350/96.23 |

*Primary Examiner*—John Lee
*Attorney, Agent, or Firm*—Roy B. Moffitt

[57] ABSTRACT

A fiber optic cable comprising an elongated core about the periphery of which is disposed a plurality of elongated tubes, one or more of the tubes containing elongated optical fibers, at least one elongated filler member ("dummy tube") having essentially the same outside diameter as the tubes containing the optical fibers composed of an elongated core means circumscribed by a coating of plastic containing a multiplicity of void spaces (e.g., foamed plastic) and a plastic jacket circumscribing the tubes and elongated filler member.

6 Claims, 4 Drawing Figures

FIBER OPTIC CABLE WITH FOAMED PLASTIC DUMMY MEMBERS

BACKGROUND OF THE INVENTION

It is customary in fiber optic cable to configure the basic elements forming the cable in a concentric and symmetrical pattern. This usually means that a center core means (may be a strength member) is provided as the initial building block. About the core's periphery, circumferentially and symmetrically are disposed a plurality of tubes of predetermined diameter and in each tube there are one or more optical fibers. In most instances, the tubes contain a filling material usually of a hydrocarbon composition. Depending on the core size (diameter), only a given number of tubes of given size (equal or unequal to the diameter of the core) can be concentrically and symmetrically disposed on the core's periphery.

Fundamental to any fiber optic configuration is the number of fibers assigned to the cable (fiber count) and the number of fibers allocated to each tube. There are many instances where the fiber count is distributed over "X" number of tubes, but one would have to use "Y" number of tubes disposed around the periphery of the core in order to achieve a symmetrical and concentric cable configuration, i.e., "Y" is greater than "X". In such cases, the known prior art practice is to use tubes in which there are no fibers ("dummy tubes") or a solid rod of some suitable material (preferably the same material out of which the tubes are made) to fill out the required circumscribing tubes so that symmetrical concentricity is achieved. Prior art practice, because of concerns arising out of the behavior of dissimilar material under certain conditions (thermal expansion and contraction for example), have followed the rule that dummy tubes or rods should be of the same material as the tubes carrying the optical fibers. Polyamid or a fluropolymer type plastic is an example of the material generally employed to make the tubes containing the optical fibers, the dummy tubes and rods. Compared to other types of plastic material such material is expensive. Thus, it is desired to design a structure of a dummy tube or rod, made from cheaper materials, that would have no adverse effect on the tubes containing optical fibers, the optical fibers themselves and the overall function of a cable made using same when a cable employing such design is subjected to wide thermal swings ($-40°$ to $70°$ C.). It is to the solution of this problem that this invention is directed.

BRIEF DESCRIPTION OF THE INVENTION

The present invention is a fiber optic cable composed of the following minimum elements: an elongated core, a plurality of elongated tubes containing one or more elongated optical fibers therein, such tubes being disposed around the periphery of the core, at least one "dummy" elongated member also disposed on the periphery of the core, and a jacket circumscribing the tubes and "dummy" elongated member. The structure of the "dummy" elongated member comprises an elongated monfilament or a plurality of strands twisted together (stranded wire rope for example), the diameter of which is smaller than the outside diameter of the tubes, about which there is disposed a circumscribing jacket of formed plastic, the jacket having a thickness of such magnitude that the monofilament-jacket composite aggregate diameter is substantially equal to the outside diameter of any one of the tubes.

DETAILED DESCRIPTION OF THE INVENTION

Figure 1:
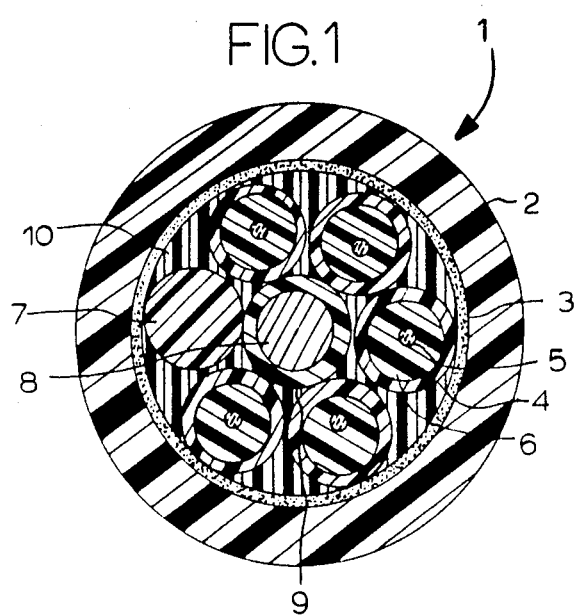
FIG. 1 is a cross section of a prior art fiber optic cable employing two empty tubes and solid rods as fillers disposed around the periphery of the cable's core.

Element 1 of FIG. 1 is a representative example of a cross section of a prior art fiber optic cable. This cable has, as one of its basic buidling blocks, a central strength member 8, which is composed of an elongated member made of steel, plastic or glass reinforced plastic, graphite, polyamides and/or aramids and if a metal is used (usually in the form of stranded wire rope), then a plastic coating 9 of some suitable plastic such as polyethylene may be employed. On the outer periphery of a plastic core member 8 (or coating 9 if a metal member is used) tubes 4 are disposed and inside tubes 4 are one or more optical fibers 5. The space delimited by the inside diameter of tube 4 not otherwise occupied by optical fiber or fibers 5 is in most instances filled with a filling compound 6, such as a petrolatum or a modified petrolatum well known in the art.

Element 1 is a five fiber cable, with a single fiber in each of the five tubes 4. Because of the outside diameter of tube 4 and the diameter of plastic coated central strength member 8, to have a symmetrical distribution of tubes there shold be six rather than five. Accordingly, there must be provided a "dummy" tube represented by element 7. Prior art dummy tubes can be either a solid rod of plastic (as shown as element 7 in FIG. 1) or it can be another tube 4 with or without a filling material or an optical fiber therein. Thus, by using six tubes, one of which is a dummy tube, or five tubes and one dummy rod, a symmetrical configuration is achieved about core member 8.

Circumscribing tubes 4, is a wrapping of fibers, such wrapping being composed of a loosely intertwined plurality of kevlar fibers which bind up tubes and keep them in the configuration as shown in FIG. 1, delimit space 10 (the space occupied by the core member, tubes and dummy tubes) and act as a strength member. Space 10 (the spaced delimited by kevlar wrapping 3 not otherwise occupied by tubes 4 and dummy tube 7) is generally filled with a filling compound, anyone of many that are well known in the prior art. Circumscribing kevlar wrapping 3 is jacekt 2 made from any suitable plastic such as polyethylene.

Figure 2:
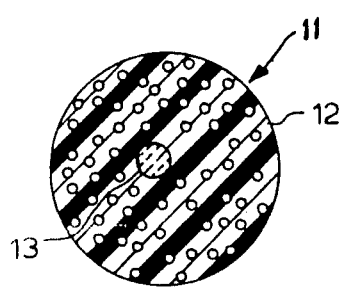
FIG. 2 is a cross section of one embodiment of a filler of the present invention.
Figure 3:
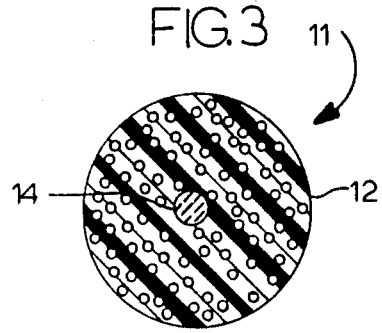
FIG. 3 is a cross section of another embodiment of a filler of the present invention.

Shown in FIG. 2 and 3 are two embodiments of the present invention either one of which is a substitute for the dummy rod 7 of FIG. 1 or a tube 4 in which there was no optical fiber and just a filling compound or no filling compound at all. Element 11 of FIG. 2 is composed of a monofilament 13 (can be a plurality of elongated strands twisted about one another) circumscribed by a jacket of foamed plastic 12. Element 11 shown by FIG. 3 is the same as that shown in FIG. 2 except that center member 14 is made of steel or some other metal.

Obviously, a plurality of elongated metallic elements can be used, either per se or loosely twisted about one another.

Figure 4:
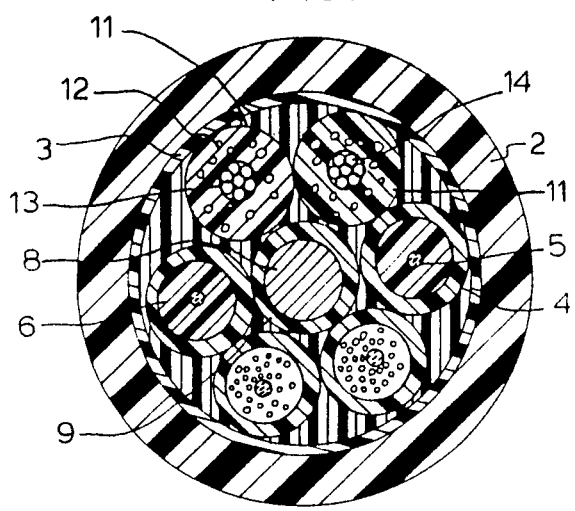
FIG. 4 is a cross section of a fiber optic cable employing the embodiments of FIGS. 2 and 3 as fillers disposed around the periphery of the cable core.

The present invention combination is shown by element 15 in FIG. 4. The only difference between the elements shown in FIG. 1 and that shown in FIG. 4 is that there are two "dummy" filler means 11 shown disposed on the outer periphery of strength member 8. Obviously, the exact number of the dummy filler means 11 is a function of the number of optical fibers desired in a given cable configuration, the size of center member 8 and the size of tube 4. Embodiment 15 of FIG. 4 is exemplary only and is not to be construed as any way by way of limitation. Filler means or dummy tube means 11 of FIG. 4 is shown with plurality of plastic strands 13 and in the case of element 14 a plurality of metallic strands 14. Either plastic or metallic can be used with equal success.

Jacket 12 circumscribes center member 13 or 14, has a diameter roughly equivalent to the outside diameter of tubes 4 and is made from any convenient low cost plastic such as polyethylene, polyurethane and polyvinyl chloride. Dummy filler means 12 have an advantage over a solid rod such as shown as by elements 7 in FIG. 1 or tube 4. Tube 4 and rod 7 are usually made from kevlar or some other expensive plastic. Filler means 7 (a solid rod) obviously uses a great deal more plastic than a foamed plastic filler means such as shown by element 11 in FIGS. 2, 3 and 4.

Changes of temperatures have little or no effect on the cable combination (element 15). The dummy filler tubes or filler means 11 both behave in an operating environment much in the same fashion as the prior art plastic rod 7 or dummy tube 4, thus presenting a significant savings in cost yet foregoing none of the advantages of the more expensive plastic tubes or rods (for example, kevlar).

What is claimed is:

1. A fiber optic cable comprising:
   (a) an elongated core member;
   (b) at least one elongated tubular member and at least one optical fiber, said optical fiber disposed in the tubular member and said tubular member disposed on the periphery of said core member;
   (c) at least one "dummy" elongated member disposed co-extensive with said elongated tubular member on the periphery of said core member, said "dummy" elongated member including a central elongated member having a diameter less than the diameter of said elongated tubular member and a jacket, circumscribing said central elongated member, composed of foamed plastic material containing a multiplicity of void spaces therein;
   (d) a jacket member circumscribing said "dummy" elongated and tubular members.

2. The fiber optic cable of claim 1 wherein the central elongated member of said "dummy" elongated member is made of either metal or plastic.

3. The fiber optic cable of claim 1 wherein the elongated tubular member in which the optical fiber is disposed also contains a plastic filling compound.

4. The fiber optic cable of claim 1 wherein said core member is a strength member made from materials selected from the group consisting of steel, graphite, aramids, iron and polyamides.

5. The fiber optic cable of claim 1 wherein the outside diameter of said "dummy" elongated member is essentially the same as that of said tubular member.

6. The fiber optic cable of claim 5 wherein said tubular and "dummy" elongated members completely circumscribe said elongated core member.

* * * * *